United States Patent [19]

Blake et al.

[11] Patent Number: 4,865,176

[45] Date of Patent: Sep. 12, 1989

[54] MODULATING INCHING VALVE WITH AUTOMATIC PRESSURE CONTROL

[75] Inventors: William W. Blake, Kewanee; Alan R. Coutant, Chillicothe; Kenneth F. Golan, Pekin; Hugh C. Morris, Morton, all of Ill.

[73] Assignee: Caterpillar Inc., Peoria, Ill.

[21] Appl. No.: 160,958

[22] Filed: Feb. 26, 1988

[51] Int. Cl.$^4$ .............................................. F16D 25/14
[52] U.S. Cl. ..................... 192/3.63; 192/52; 192/87.13; 192/109 F
[58] Field of Search ................ 192/3.63, 48.1, 52, 192/87.1, 87.11, 87.13, 109 F, 3.57

[56] References Cited

U.S. PATENT DOCUMENTS

| | | | |
|---|---|---|---|
| 3,137,311 | 6/1964 | Rohweder et al. | 137/495 |
| 3,923,076 | 12/1975 | Blake | 137/495 |
| 4,036,342 | 7/1977 | Finn | 192/109 F |
| 4,150,737 | 4/1979 | Patton | 192/109 F |
| 4,349,094 | 9/1982 | Pavesi | 192/109 F |
| 4,474,082 | 10/1984 | Spokas et al. | 192/109 F |
| 4,676,348 | 6/1987 | Coutant | 192/3.57 |

FOREIGN PATENT DOCUMENTS

| | | | |
|---|---|---|---|
| 58-47629 | 3/1983 | Japan | 192/52 |
| 59-81231 | 5/1984 | Japan | 192/109 F |

Primary Examiner—Leslie A. Braun
Assistant Examiner—David A. Testardi
Attorney, Agent, or Firm—J. W. Burrows

[57] ABSTRACT

Inching valves for providing controlled slow movement of a vehicle normally have a valve mechanism therein to control the pressure level of the fluid being directed to the driving clutch of the vehicle. Upon release of the pedal, a sudden jerk of the vehicle may occur. The modulating inching valve of the subject arrangement provides a housing having a valving mechanism slidably disposed therein and operative to selectively block communication between an inlet port and an outlet port. The modulating inching valve further includes an input actuator mechanism operative to selectively control the valve mechanism in response to the position of the operator's inching pedal. Through a portion of a predetermined travel distance of the input mechanism the operator controls the rate of pressure being supplied to the fluid actuated device and during the remaining portion of the predetermined travel distance the modulating relief valve automatically controls the rate of pressure rise. The modulating inching valve provides a compact arrangement allowing selective control of the pressure level to the fluid actuator device at lower torque levels within the clutch but inhibits the operator'3 s ability to control the rate of pressure rise to the clutch during higher torque levels. This eliminates undue heat and abnormal wear of the elements and further eliminates the tendency of the vehicle to jerk if the inching pedal is fully released quickly.

13 Claims, 4 Drawing Sheets

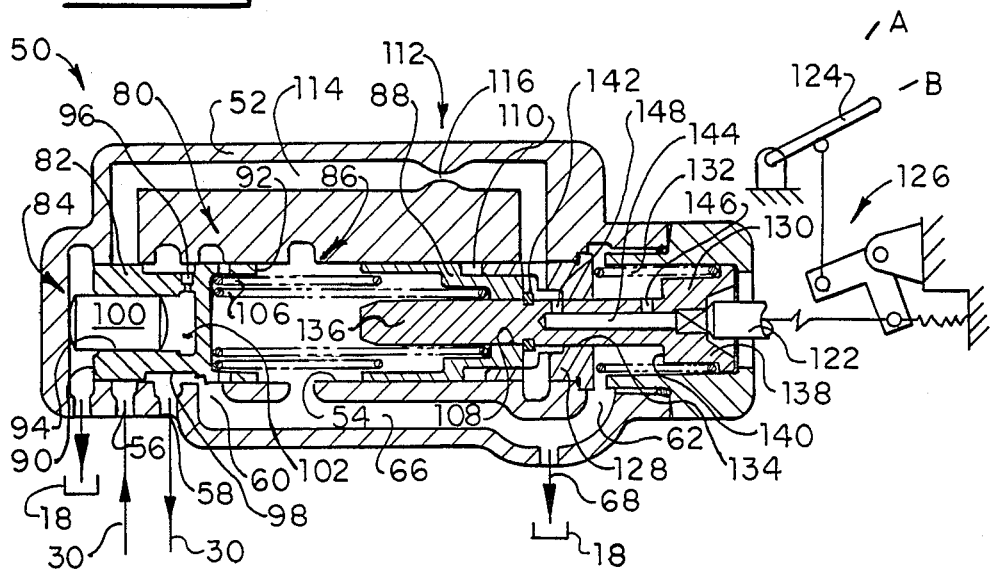
Fig-2-
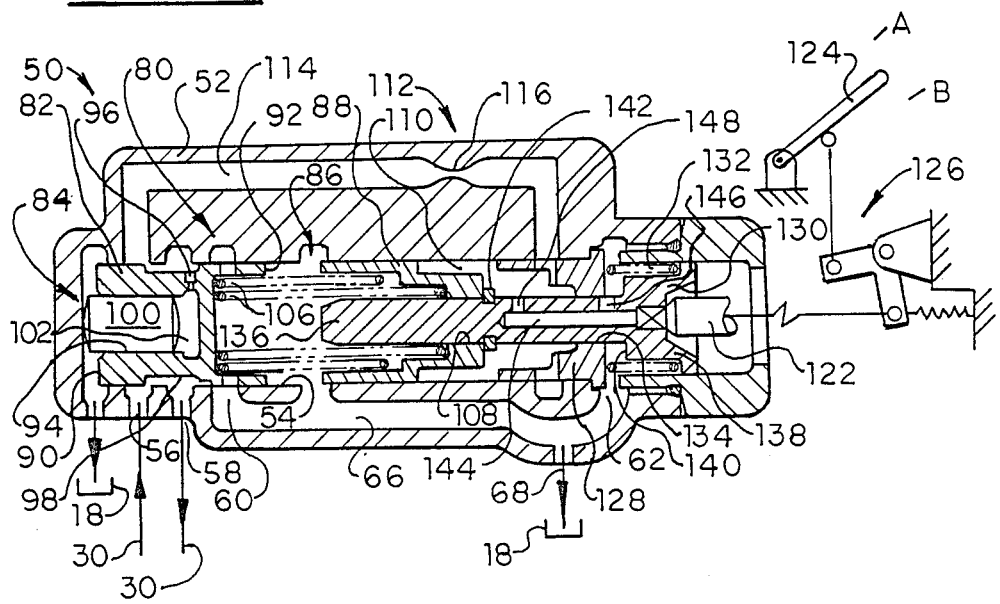
Fig-3-

Fig-4-
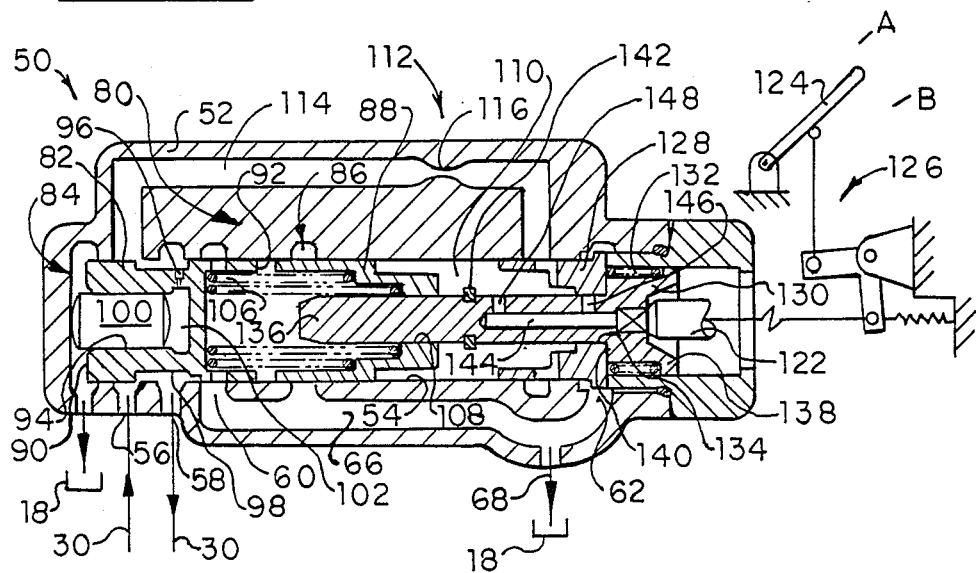
Fig-5-
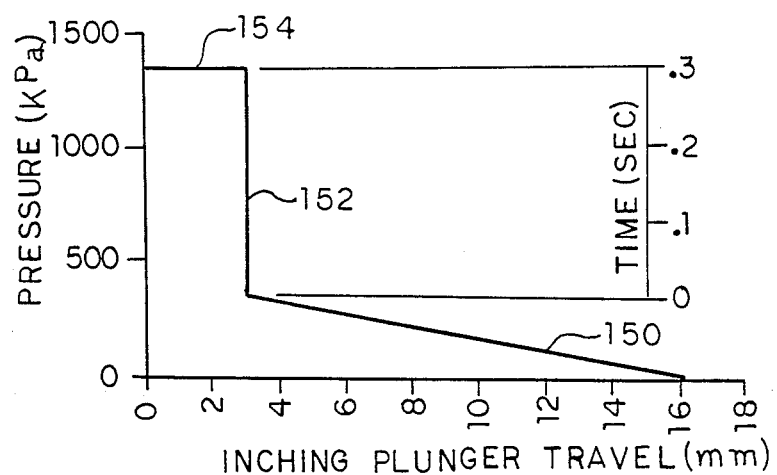

MODULATING INCHING VALVE WITH AUTOMATIC PRESSURE CONTROL

DESCRIPTION

1. Technical Field

This invention relates generally to a modulating inching valve for use in a vehicle transmission control system and more particularly to a modulating inching valve having selective control of the rate of pressure rise to the fluid actuated device during inching over a preselected range of the total inching pedal travel and an automatic control over the rate of pressure rise during the remaining portion of the input control.

2. Background Art

In transmissions having a plurality of gear sets for establishing different speed ratios and different directional modes, the gear sets must be separately actuated by individual fluid actuated devices, such as disc-type friction clutches. Within these transmissions, it is necessary to engage at least one speed clutch and one directional clutch in order to transmit driving force from the transmission to the drive train. Normally one set of the speed or directional clutches is heavier and more durable in order to absorb the shock loads induced when transmitting power to the drive train of the vehicle. During operation, the heavier clutch is engaged last. In many applications, the directional clutch is the heavier clutch.

It is often desirable to operate a vehicle at high idle but with very slow vehicle speed, commonly referred to as "inching". This many times is accomplished by the operator controlling, through a manually operated valve, the level of pressure to the heavier directional clutch and establishing a controlled rate of slippage therein. By using this arrangement, the operator obtains a "feel" of the degree of clutch slippage that is taking place.

It is most desirable for the operator to have precise inching control of the vehicle at the very slow ground speeds which is accomplished by limited amounts of clutch engagement. As well known, during clutch slippage, heat energy is generated which also increases the wear on the clutch elements. The degree of heat generated and the amount of wear is directly proportional to the vehicle gear selection during inching and the level of pressure being directed to the clutch for engagement thereof. Consequently, it is desirable not to have inching control available once the pressure level to the clutch reaches a predetermined level. The pressure level being directed to the clutch is directly related to the degree of inching desired by the operator through operation of his inching input pedal. Once the operator has achieved desired inching of the vehicle, the input pedal is returned to its original position which permits full system operating pressure to again be delivered to the clutch. If the input pedal is released too quickly, the system is subjected to a harsh, abrupt start or "jerk". The "jerk" subjects the system to undue forces and at times causes premature failure of system components. Furthermore, the operator's comfort is likewise jeopardized.

Sometimes it is desirable to have inching control of a vehicle that is being operated in higher gear ratios. When operating the vehicle at the higher gears, the level of pressure being directed to the clutch for inching control may be too high. This is normally detrimental since too much torque is being transmitted through the clutch for the higher gear ratio. This results in more heat being generated and more wear on the clutch elements during slipping of the clutch elements at the higher torque levels. Consequently, in some systems, it is desirable to provide lower controlled pressure levels for inching at various vehicle gear ratios.

Various arrangements have been used in the past in an effort to provide modulated control of the pressure to the clutches of a transmission and also to provide an inching control for vehicles. One such arrangement is disclosed in U.S Pat. No. 3,137,311 which issued on June 16, 1964 to G. D. Rohweder, et al. and assigned to the assignee of the present application. This patent teaches a control system for a transmission having a manually operated modulation valve for providing an inching control of the transmission. In this arrangement, the operator can effectively reduce the pressure for engagement of the input clutch of the transmission and cause the clutch to slip responsive to the position of the operator control level. The pressure level to the transmission input clutch is totally controlled by the operator.

U.S. Pat. No. 3,923,076 which issued on Dec. 2, 1975 to William Wayne Blake and assigned to the assignee of the present application teaches a control system for a transmission having directional and speed clutches and a control valve for controlling the rate of pressure rise to the clutches during engagement thereof. This system also teaches an inching control valve which allows, through operator input, the ability to inch a vehicle through a given range of operator input. By controlling a signal to the remote pressure modulating valve, the reengagement of the clutch during the last portion of the inching pedal control is automatically controlled. This system requires additional external lines to interconnect the modulating relief valve and the inching control valve to accomplish the desired objective. The use of small signal lines interconnected between two remotely located valves is detrimental since they are subject to breakage and are also sensitive to varying temperatures.

U.S. Pat. No. 4,349,094 which issued on Sept. 14, 1982 to Franco Pavesi teaches a control system for a transmission having friction clutches. This system provides an arrangement for modulating the rate of pressure rise to the clutches during engagement thereof. This system also includes an operator control lever which can vary the operating pressure level to the clutch allowing the operator to selectively adjust the pressure level to the clutch or allows the operator to selectively vary the pressure level of the fluid to the clutch for inching of the vehicle.

U.S Pat. No. 4,676,348 which issued on June 30, 1987 to Alan R. Coutant and assigned to the assignee of the present application teaches a control system for a transmission having directional and speed clutches and a pressure modulating valve for controlling the rate of pressure rise to the respective clutches. This arrangement also teaches a mechanism using a plurality of slugs slidably disposed in the modulating valve to provide a lower standby pressure on the clutches following full engagement of the clutches. The mechanism which establishes the lower standby pressure to the actuated clutches is responsive to the pressure level in the clutches reaching a predetermined magnitude prior to the lower standby pressure being initiated. This arrangement does not provide any inching control of the vehicle.

The present invention is directed to overcoming one or more of the problems as set forth above.

DISCLOSURE OF THE INVENTION

In one aspect of the invention a modulating inching valve is provided for use in a vehicle transmission control system having a source of pressurized fluid, a reservoir, a plurality of fluid actuated devices, a plurality of valve mechanisms operative to selectively control the respective plurality of fluid actuated devices, and a pressure control valve operative to control the pressure level of the fluid to the fluid actuated devices. The modulating inching valve includes a housing having a bore defined therein, an inlet port operatively connectable to the source of pressurized fluid, an outlet port operatively connectable to at least one of the fluid actuated devices, and first and second drain ports. Each of the drain ports intersecting the bore at axially spaced locations. A valve means is provided in the modulating inching valve for controlling the rate of pressure rise between the inlet port and the outlet port and is slidably disposed in the bore. The valve means has a valving element operative in use to control fluid communication between the inlet port and the outlet port. The valve means also has pressure responsive means for biasing the valving element to a position blocking communication between the inlet port and the outlet port and opening communication between the outlet port and the first drain port. Means for biasing the valving element in opposition to the pressure responsive means is provided along with a load piston operative to control the force of the biasing means. A pressure chamber is defined in the bore adjacent the load piston and a restrictive conduit means is provided for controllably interconnecting the inlet port and the pressure chamber. The modulating inching valve further includes an input actuator mechanism disposed in the bore of the housing adjacent the pressure chamber and operative in use to move through a predetermined travel distance. The input actuator mechanism is operative to control communication between the pressure chamber and the second drain port so that the rate of pressure rise between the inlet port and the outlet port is selectively controlled for inching of the vehicle through a portion of the predetermined travel distance of the input mechanism and the rate of pressure rise is automatically controlled with movement of the input actuator mechanism in the remaining portion of the predetermined travel distance.

The present invention provides a modulating inching valve for use in a transmission control system to insure selective operator control during a predetermined portion of inching control pedal travel and to provide an automatic control of the rate of pressure rise in the remaining portion of the inching control pedal travel. The input actuator mechanism in conjunction with the valve means of the modulating inching valve provides a compact arrangement to achieve both selective control of the rate of pressure rise during inching and automatic control thereof. One embodiment of the subject arrangement also provides a means for establishing a plurality of different biasing forces operational to change the range of system control pressure used for inching the vehicle at various vehicle gear ratios. This allows the torque level at the clutches to be altered when inching at different vehicle speed ratios in order to eliminate the high heat levels and extra wear generated when trying to operate the vehicle at higher speed ratios without changing the range of system control pressure.

BRIEF DESCRIPTION OF THE DRAWINGS

FIG. 2 is a partial schematic and diagrammatic representation of a portion of the system illustrated in FIG. 1 shown in one mode of operation;

FIG. 3 is a partial schematic and diagrammatic representation of the portion of the system illustrated in FIG. 2 shown in yet another mode of operation;

FIG. 4 is a partial schematic and diagrammatic representation of the portion of the system illustrated in FIG. 2 shown in still another mode of operation;

FIG. 5 is a graph illustrating the relationship between the inching plunger travel and the operating system pressure and also illustrating the time relationship of the rate of pressure rise during one phase of the operation.

BEST MODE FOR CARRYING OUT THE INVENTION

Figure 1:
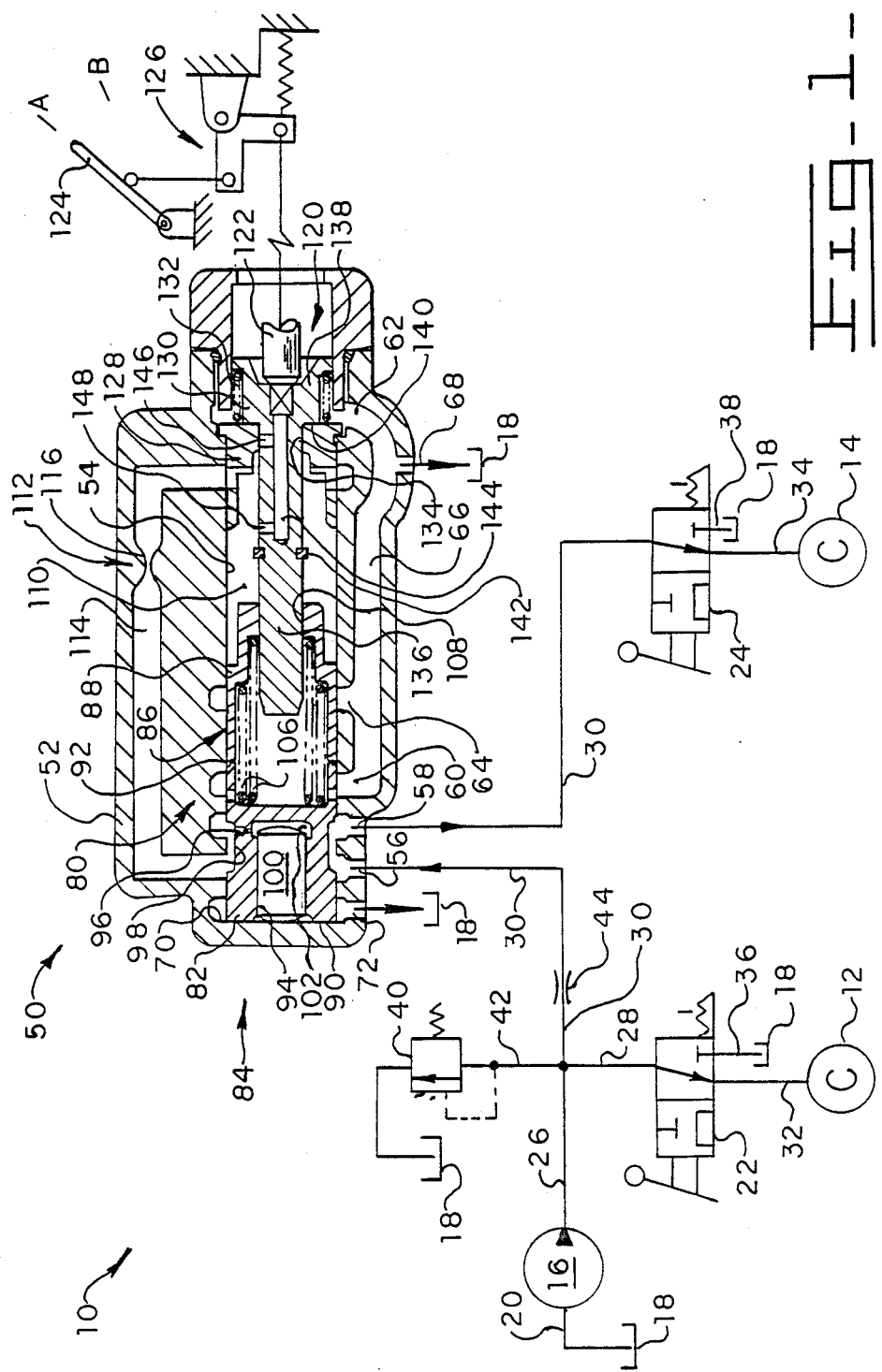
FIG. 1 is a partial schematic and diagrammatic representation of a fluid system incorporating an embodiment of the present invention.

Referring now to the drawings, and more particularly FIGS. 1–4, a fluid system 10 is shown for use in a vehicle (not shown) to selectively control the engagement and disengagement of a plurality of fluid actuated devices, such as a speed clutch 12 and a directional clutch 14 and to provide inching control of the vehicle.

The fluid system 10 includes a source of pressurized fluid, such as a pump 16, adapted to receive fluid from a reservoir 18 through a conduit 20. A plurality of valve mechanisms, such as speed selector valve 22 and directional selector valve 24, are included in the fluid system 10 and are connected to the pump 16 by respective distribution conduits 26,28,30. A conduit 32 connects the speed clutch 12 to the speed selector valve 22 while a conduit 34 connects the directional clutch 14 with the directional selector valve 24. Each of the selector valves 22,24 are respectively connected to the reservoir 18 by conduits 36,38. A pressure control valve 40 is connected to the pump 16 by a conduit 42 and the distribution conduit 16 and is operational to control the maximum pressure level of the fluid from the pump 16. An orifice 44 is located in the distribution conduit 30 upstream of the directional selector valve 24 and operative to ensure that the speed clutch 12 fills prior to the directional clutch 14.

A modulating inching valve 50 is located in the distribution conduit 30 and is operative to control the fluid pressure in the distribution conduit 30 downstream thereof. The modulating inching valve 50 includes a housing 52 having a bore 54 defined therein, an inlet port 56, an outlet port 58, and first and second drain ports 60,62 each intersecting the bore 54 at axially spaced locations. A third drain port 64 also intersects the bore 54 and along with the first and second drain ports 60,62 are connected to the reservoir 18 through a common passageway 66 and a conduit 68. An end chamber 70 is connected to the tank 18 through a fourth drain port 72.

Valve means 80 for controlling the rate of pressure rise between the inlet port 56 and the outlet port 58 is slidably disposed in the bore 54. The valve means 80 has a valving element 82, pressure responsive means 84, means 86 for biasing the valving element 82, and a load piston 88. The valving element 82 has first and second ends 90,92, a blind bore 94 located adjacent the first end 90 of the valving element 82, and a radial passageway 96 interconnecting the bottom of the blind bore 94 and a peripheral groove 98 of the valving element 82.

A slug 100 is slidably disposed in the blind bore 90 and defines a pressure chamber 102 between the bottom of the blind bore 94 and the slug 100. The blind bore 94, slug 100, pressure chamber 102, and the radial passageway 96 make up the pressure responsive means 84.

The means 86 for biasing the valving element 82 includes a spring assembly 106 having inner and outer springs and is disposed in the bore 54 between the second end 92 of the valving element 82 and the load piston 88. As shown in FIGS. 2 and 3, the outer spring of the spring assembly 106 has a length sufficient to engage the load piston 88 only during a portion of the load piston's movement. The load piston 88 has a bore 108 defined therein and is slidably disposed in the bore 54 adjacent the second end 92 of the valving element 82. A pressure chamber 110 is defined in the bore 54 at a location adjacent the load piston 88 and at the end of the bore 54 opposite to the valving element 82.

Restrictive passage means 112 for controllably interconnecting the inlet port 56 and the pressure chamber 110 is provided in the housing 52 and includes a passage 114 with an orifice 116 defined therein.

An input actuator mechanism 120 is disposed in the bore 54 adjacent the pressure chamber 110 and is operative in use to move through a predetermined travel distance. An input plunger 122 is operatively associated with the input actuator mechanism 120 and is connected to an inching pedal 124 through associated linkages 126. The inching pedal 124 is movable through a distance A-B to obtain a predetermined travel distance of the input plunger 122 with respect to the input actuator mechanism 120. In order to inch the vehicle, the inching pedal 124 is depressed to the fully actuated position B and gradually released to obtain the desired vehicle inching. The input actuator mechanism 120 includes a sleeve 128, an input member 130, and a spring 132 disposed between the sleeve 128 and the input member 130.

The sleeve 128 has a bore 134 defined therein and the sleeve 128 is movable between first and second positions. The input member 130 has a first end portion 136 slidably disposed within the bore 134 of the sleeve 128 and the bore 108 of the load piston 88 and is movable through the predetermined travel distance as established by the input plunger 122. The input member 130 has a second end portion 138 and a shoulder 140 is defined on the second end portion 138 adjacent the first end portion 136. A stop 142, such as a snap ring, is located on the first end portion 136 of the input member 130 and is operative to limit the amount of travel of the load piston 88 on the first end portion 136. A passageway 144 is defined in the first end portion 136 of the input member 130 and has first and second radial openings 146,148 opening to the peripheral surface of the first end portion 136 at axially spaced locations.

Referring now to FIG. 5, the graph illustrates the relationship of the inching input plunger travel versus the pressure level in the control system. The graph also illustrates the time relationship of the pressure level when the modulating inching valve is in the automatic mode of operation.

More specifically, as noted by a gradually sloping line 150, the pressure level in the system acting on the clutch 14 is increasing at a gradual rate as the input member 130 is being released during inching operation. Once the inching input plunger 122 is released to the position of approximately 3 mm (0.12 inches) of travel, the selective control of the operator is ended and the automatic mode of the modulating inching valve 50 is initiated. A vertical line 152 on the graph indicates the increase in pressure that occurs once the automatic mode is initiated. Furthermore, it is noted that the increase in pressure is accomplished over a predetermined period of time regardless of the position of the inching input plunger 122 in its last portion of travel distance. A horizontal line 154 on the graph indicates the remaining travel distance of the inching input plunger and further indicates that there is no change in the system operating pressure with respect to the remaining portion of the inching input plunger travel since the system pressure is being independently controlled by the pressure control valve 40.

Figure 6:
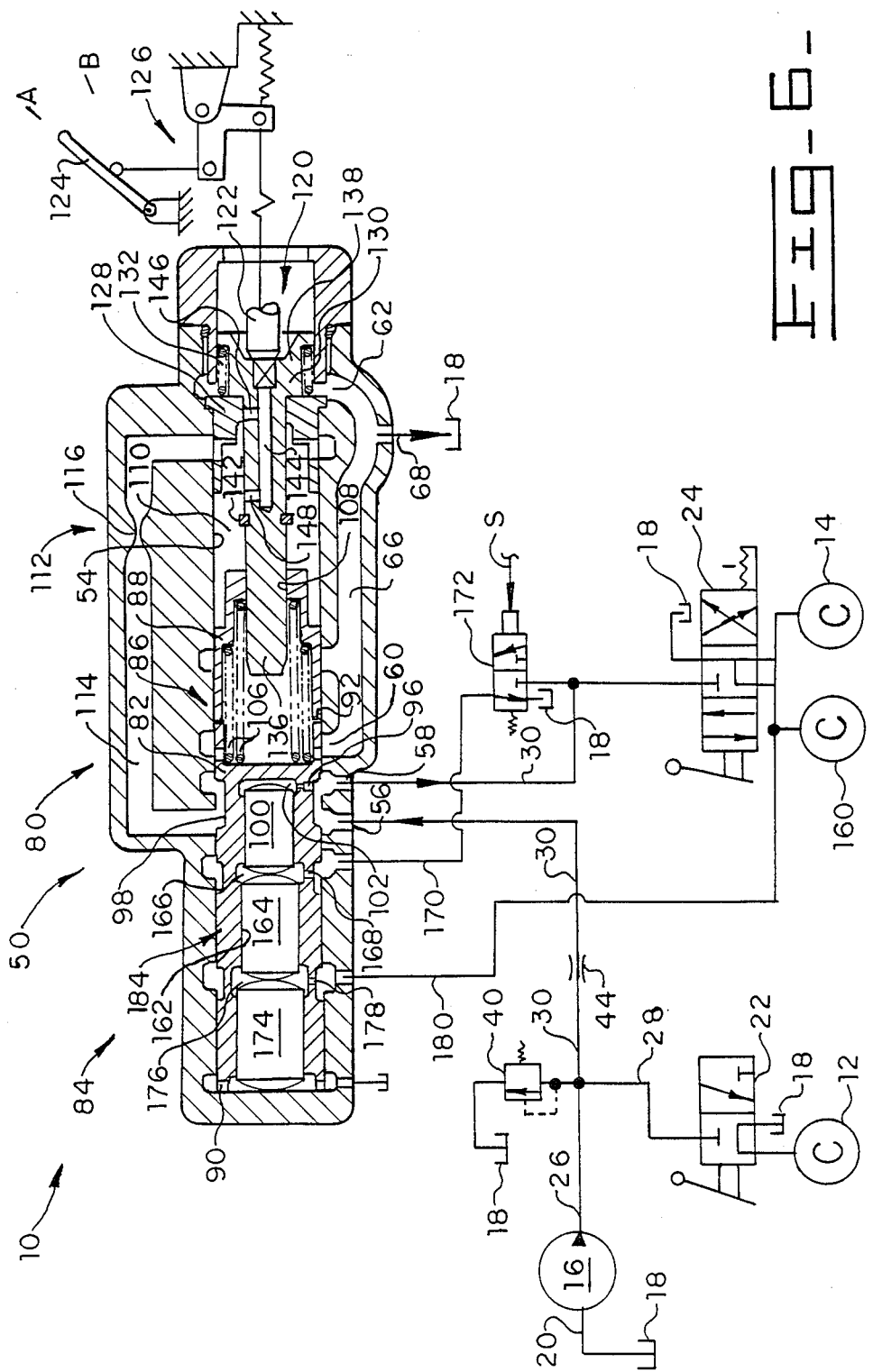
FIG. 6 is a partial schematic and diagrammatic representation of a fluid system incorporating another embodiment of the present invention.

Referring to FIG. 6, another embodiment of the fluid system 10 is disclosed which includes a modified form of the modulating inching valve 50. Like elements will be denoted with like numerals and modified elements will be denoted with prime numbers. The fluid system 10 of the subject embodiment includes an additional fluid actuated device, such as a clutch 160, and a selector valve 24' capable of controlling fluid flow to either the fluid actuator device 14 or the fluid actuator device 160.

The valve means 80 of the subject embodiment includes a valving element 82' having first and second ends 90,92 and defines a stepped blind bore 162 adjacent the first end 90. The slug 100 is slidably disposed in the stepped blind bore 162 to define the pressure chamber 102 as previously set forth in the first embodiment. The first radial passageway 96, as previously described, interconnects the pressure chamber 102 with the outlet port 58. A second slug 164 having a cross-sectional area greater than the first slug 100 is slidably disposed in the stepped blind bore 162 adjacent the first slug 100 to define a second pressure chamber 166 between the first and second slugs 100,164. A second radial passageway 168 is defined in the valving element 82' and communicates the second pressure chamber 166 with distribution passage 30 downstream of the modulating inching valve 50 through a conduit 170. A two position valve 172 is disposed in the conduit 170 and is movable in response to a control signal S from a first position at which communication of pressurized fluid therethrough is blocked and the pressure chamber 166 is in open communication with the reservoir 18 and a second position at which pressurized fluid is in open communication with the pressure chamber 166. The control signal S being generated in response to predetermined vehicle gear ratios. A third slug 174 having a cross-sectional area greater than that of the second slug 164 is slidably disposed in the stepped blind bore 162 adjacent the second slug 164 and defines a third pressure chamber 176. A third radial passageway 178 communicates, through a conduit 180, the third pressure chamber 176 with the additional clutch 160 downstream of the selector valve 24'.

The stepped bore 162 of the valving element 82' along with the first, second and third pressure chambers 102,166,176 and the first, second and third radial passageways 96,168,178 make up a means 184 for establishing a plurality of different biasing forces. The means 184 for establishing the plurality of biasing forces is responsive when in use to various operating conditions of the vehicle and is part of the pressure responsive means 84.

The remaining elements of the embodiment illustrated in FIG. 6 are the same as those set forth above in FIGS. 1-4. It is recognized that various forms of the fluid system 10 could be used without departing from the essence of the invention. For example, the pressure control valve 40 could be a modulating pressure relief valve as is commonly used in many transmission control systems to control the rate of pressure to the clutches. Also, the selector valves 22,24,24' could also be operated electrically or hydraulically without departing from the essence of the invention. Other modifications could be made to components within the modulating inching valve without departing from the essence of the subject invention.

Industrial Applicability

As shown in FIG. 1, the fluid system 10 is in an operational mode in which the clutches 12 and 14 are engaged by pressurized fluid from the pump 20 being directed through the respective speed and direction selector valves 22,24. The pressure control valve 40 maintains a maximum predetermined pressure in the distribution conduits 26,28,30. The orifice 44 restricts fluid flow through the distribution conduit 30 in order to ensure that the speed clutch 12 is filled prior to filling of the directional clutch 14. In this mode of operation, the inching pedal 124 is in its unactuated position A and there is free communication of the fluid in the distribution conduit 30 between the inlet port 56 and the outlet port 58 of the modulating inching valve 50.

With the inching pedal 124 in its unactuated position, as shown in FIG. 1, pressurized fluid in the outlet port 58 is directed to the pressure chamber 102 through the radial passage 96. The pressurized fluid creates an effective force urging the valving element 82 towards a position in which communication between the inlet port 56 and the outlet port 58 is blocked. Simultaneously therewith pressurized fluid from the inlet port 56 is directed through the passage 114 across the orifice 116 into the pressure chamber 110. This pressurized fluid in pressure chamber 110 urges the load piston 88 towards the valving element 82. The movement of the load piston 88 towards the valving element 82 increases the biasing force on the spring assembly 106 and the resulting force is sufficient to overcome the effective force created in the pressure chamber 102 which urges the valving element 82 towards the blocking position noted above. As long as the inching pedal 124 is in the unactuated position, the valving element 82 is maintained in the position illustrated wherein the inlet port 56 is in continuous fluid communication with the outlet port 58.

With reference to FIG. 2, if it is desired by the operator to control the vehicle by inching, the operator would fully depress the inching pedal 124 from the unactuated position A to the fully actuated position B. In this fully actuated position B, the input member 130 is moved from its initial position shown in FIG. 1 to its second position as illustrated in FIG. 2. In the position shown in FIG. 2, the pressurized fluid in pressure chamber 110 is communicated through the passageway 144 to the second drain port 62 and subsequently to the reservoir 18 through the conduit 68.

Since the pressurized fluid being supplied to the pressure chamber 110 must come through the passage 114 across the orifice 116, the pressure level in pressure chamber 110 cannot be maintained and is quickly reduces to a substantially zero pressure chamber 110 and the biasing force of the spring assembly 106, the load piston 88 moves away from the valving element 82. The load piston 88 moves until it abuts the stop 142 and is maintained in that position. At this position of the load piston 88, the biasing force of the spring assembly 106 is substantially zero. Consequently, the effective force in pressure chamber 102 is sufficient to move the valving element 82 to the position at which the inlet port 56 is blocked from the outlet port 58. As the inlet port 56 is being closed off by the valving element 82, the outlet port 58 is being simultaneously opened to the first drain port 60. Since the effective force holding the valving element 82 in the position to close the inlet port 56 is the result of the pressurized fluid in the outlet port 58, the valving element 82 maintains a position in which the outlet port 58 is in communication with the first drain port 60 and communication of the inlet port 56 is blocked from the outlet port 58. If the force from the spring assembly 106 is not fully unloaded, the valving element 82 will maintain a position in which a limited amount of fluid from the inlet port 56 is allowed to pass to the outlet port 58 and through the radial passageway 96 to the pressure chamber 102 to establish an effective force to resist any limited biasing force from spring assembly 106.

Referring now to FIG. 3, in order to initiate controlled inching of the vehicle, the operator moves the inching pedal 124 from the position B towards the position A. During this operator controlled inching, the input member 130 is moved to an intermediate position. At this intermediate position, the passageway 144 is still communicating the pressure chamber 110 with the second drain port 62. As the input member 130 moves from its rightward position, as shown in FIG. 3, towards the leftward position, the stop 142 urges the load piston 88 towards the valving element 82. The movement of the load piston 88 towards the valving element 82 compresses the inner spring of the spring assembly 106 which transfers additional load to the valving element 82 urging the valving element 82 towards a position to open communication between the inlet port 56 and the outlet port 58.

As the valving element 82 opens communication between the inlet port 56 and the outlet port 58, the communication between the outlet port 58 and first drain port 60 is blocked. As the pressure level in the outlet port 58 increases, the pressure level in the pressure chamber 102 simultaneously increases and the resulting effective force resists the bias of the inner spring of the spring assembly 106 and maintains the valving element 82 in a position to sustain a pressure level in the outlet port 58 that is proportional to the position of the input member 130. With the input member 130 at the position illustrated in FIG. 3, the first radial opening 146 of the passageway 144 is being partially closed off by the relationship of the first end portion 136 of the input member 130 sliding within the bore 134 of the sleeve 128. As long as the effective cross-sectional area of the radial opening 146 remains substantially larger than the effective cross-sectional area of the orifice 116, the pressure level of the fluid in the pressure chamber 110 cannot increase. Also, during this phase in the operation, the stop 142 is causing the load piston to move at the same rate that the input member 130 is being moved. Consequently, as long as the radial opening 146 of the passageway 144 is in open communication with the second drain port 62, the operator has full control over inching of the vehicle.

Referring now to FIG. 4, the inching pedal 124 has been further moved by the operator from the position B towards the position A. At this position, the sleeve 128 has moved from its initial position to its second position against the bias of the spring 132. This happened as a result of the operator moving the inching pedal 124 from the position disclosed in FIG. 3 to the position shown in FIG. 4. This extra amount of movement resulted in the radial opening 146 of the passageway 144 being further restricted to the point that the fluid in the pressure chamber 110 is pressurized. Since the spring rate of the spring 132 is very low, a small increase of fluid pressure within the pressure chamber 110 acting on the effective cross-sectional area of the sleeve 128 forces the sleeve 128 to its second position as clearly shown in FIG. 4. The movement of the sleeve 128 to its second position totally closes the radial opening 146 and fully interrupts any fluid flow through the passageway 144. The closing of the passageway 144 causes in the pressure level within the pressure chamber 110 to continually increase. The increasing pressure in the pressure chamber 110 acting on the effective cross-sectional area of the load piston 88 urges the load piston 88 towards the valving element 82 which continually adds additional load to the assembly 106. As shown in FIG. 4, the load piston is now in contact with the outer spring of the spring assembly 106. The additional biasing force causes a greater rate of increase in the system control pressure. It should be recognized that the length of the outer spring could be increased or decreased in order to obtain the additional spring force when desired. Since the fluid flow into the pressure chamber 110 is entering at a controlled rate, the movement of the load piston towards the valving element is likewise moving at a controlled rate which increases the force on the spring assembly at a controlled rate.

Simultaneously with the increase load on the spring assembly 106, the pressure level in the outlet port 58 is increased due to the opening of the inlet port 56 to the outlet port 58 being increased. The increase in fluid pressure at the outlet port 58 is also communicated with the pressure chamber 102 through the radial passageway 96 to provide an effective force resisting the valving element 82 from moving to a position to further open communication of the inlet port 56 with the outlet port 58. Due to the interaction between the biasing force of the spring assembly 106 urging the valving element 82 to further open communication between the inlet port 56 and the outlet port 58 and the effective force in the pressure chamber 102 resisting the biasing force of the spring assembly 106, the pressure level in the outlet port 58 is effectively controlled at a predetermined level.

Once the sleeve 128 moves from its first position to its second position which totally blocks the radial opening 146 of the passageway 144, the modulating inching valve 50 is in an automatic mode of operation. During this phase of operation, the operator has no control over the rate of pressure rise in the outlet port 58.

Referring to FIG. 5, the line 150 would be representative of the operation of the system in the mode of operation in which the operator has full control over inching of the vehicle by controlling the pressure rise rate in outlet port 58. For example, when the inching pedal travel is at irs position B, which in the graph is representative of 16 mm (0.63 inches), the pressure in the outlet port 58 would be zero. As the inching pedal 124 is gradually released, the pressure at the outlet port 58 would increase from the zero level to an increased level. For example, when the inching pedal is at the travel point of 6 mm (0.24 inches), the pressure level at outlet port 58 would be approximately 250 kpa (36 psi). This particular pressure level at outlet 58 acting on the fluid actuator device 14 provides a particular rate of inching of the vehicle. If the operator wants to have slower inching, he would further depress the inching pedal 124 and consequently, if he wants increased inching, he would further release the inching pedal 124. Movements of the inching pedal 124 between 3 mm (0.12 inches) and 16 mm will give varying rates of inching movement of the vehicle due to a changing pressure level acting on the clutch 14.

Once the inching pedal is released to a position equivalent, for example, to approximately 3 mm, the sleeve 128 is quickly biased towards its second position totally blocking the radial opening 146 of the passageway 144 and at this point the operator is no longer in control of the rate of pressure rise in the outlet port 58. The modulating inching valve 50 automatically controls the rate of pressure rise and as shown by the vertical line 152, the rate of pressure rise increases from approximately 300 kpa (43.5 psi) to a maximum pressure level of approximately 1,400 kpa (203 psi) in approximately 3/10 of one second. Any movement of the inching pedal 124 between zero travel and 3 mm will have no effect on the rate of pressure rise at the outlet port 58. Consequently, a sudden release of the inching pedal will not subject the system to a harsh, abrupt start.

Referring now to FIG. 6, the modulating inching valve 50 of the alternate embodiment functions quite similar to that discussed above. Except the modulating inching valve 50 of FIG. 6 can provide modulated inching control at different system pressure level ranges depending on various operating conditions of the vehicle. More specifically, pressurized fluid with the pressure chamber 102 through the radial passageway 96 and functions identically to that set forth in the description of FIGS. 1-4.

A lower system control pressure range for inching of the vehicle in a higher gear ratio is automatically obtained when the operator selects the higher gear ratio. The control signal S is generated in response to the selection of the higher gear ratio and is effective to move the two position valve 172 from its first blocking position to its second open position. It is recognized that the control signal S may be hydraulical, electrical, or even manual without departing from the essence of the invention. In the second position of the two position valve 172, pressurized fluid from the distribution conduit 30 is communicated through conduit 170 and radial passageway 168 to the pressure chamber 166. Since the effective cross-sectional area of the slug 164 is larger than the cross-sectional area of the slug 100, the effective force moving the valving element 82' towards the position to interrupt flow between inlet port 56 and outlet port 58 is greater. The effective pressure level at the outlet port 58 is less than that developed when the valving element 82' is being biased by the force from the pressure chamber 102. Again, it should be emphasized that a larger force biasing the valving element 82' towards a position closing communication between inlet port 56 and outlet port 58 results in a lower pressure level in the outlet port 58. This is apparent since the force developed by the spring assembly 106 is constant for a given position. Therefore, the valving element 82′ further restricts the communication between the inlet port 56 and the outlet port 58 resulting in a lower pressure level at the outlet port 58. Upon returning the two position valve 172 to its first position, the control pressure at the outlet port 58 returns to the level as previously described with respect to FIGS. 1–4 and the pressure chamber 168 is in communication with the reservoir 18.

If the operator is operating the vehicle at yet another travel condition and wants to have inching control at yet another lower system control pressure range, the additional pressure range may be obtained by directing the fluid pressure from the additional clutch 160 when in use to the pressure chamber 176 through the conduit 180 and radial passageway 178. Since the cross-sectional area of the plug 174 is larger than the cross-sectional area of either of the slugs 100,164, an effective force is established which is larger than the effective force of either of the other pressure chambers 102,166. This effective force urges the valving element 82′ toward the position to block fluid communication between the inlet port 56 and the outlet port 58. Again, as stated above, for a given position of the load piston 88, the pressure level of the fluid at the outlet port 58 would be lower than that established by the force from pressure chambers 102,166.

Therefore, the effective operating pressure at the outlet port 58 can be automatically controlled at various levels in order to provide inching control at various operating conditions of the vehicle without subjecting the clutches to undue thrust loads which generates excessive heat and attributes to more wear.

It should be recognized that the source of pressurized fluid for the pressure chambers 102,166,176 could be received from other sources. However, it is most expedient to utilize the pressure source that is being directed to the clutch or clutches that are being slipped and to change the cross-sectional area of the slugs utilized in the pressure responsive means 84.

The modulating inching valve 50 of the fluid system 10 as set forth above incorporates a valve means 80 to control the rate of pressure rise between the inlet port and the outlet port thereof and an input actuator mechanism 120 to selectively provide a range of system control pressure to the clutch 14. The range of system control pressure to the clutch 14 is controlled by the operator through a given portion of his full inching pedal travel and is automatically controlled in the final portion of the inching pedal travel. This relationship allows precise operator inching control when subjecting the clutch 14 to the lower pressure levels. However, when flipping is occurring at higher clutch pressures that generates undue wear and abnormal amounts of heat energy then the modulating inching valve 50 automatically takes control of the rate of pressure rise and totally re-engages the clutch 14 fully over a predetermined period of time. This happens without the operator being able to override the automatic control. By having the valve means 80 and the input actuator mechanism 120 within a single modulating inching valve, unnecessary external lines, which would otherwise be necessary to connect signal passages, are effectively eliminated.

Other aspects, objects and advantages of this invention can be obtained from a study of the drawings, disclosure and the appended claims.

We claim:

1. A modulating inching valve adapted for use in a vehicle transmission control system having a source of pressurized fluid, a reservoir, a plurality of fluid actuated devices, a plurality of valve mechanisms operative to selectively control the respective plurality of fluid actuated devices, and a pressure control valve operative to control the pressure level of the fluid to the fluid actuated devices, comprising:

a housing having a bore defined therein, an inlet port operatively connectable to the source of pressurized fluid, an outlet port operatively connectable to at least one of the fluid actuated devices, and first and second drain ports, each of said ports intersecting said bore at axially spaced locations;

valve means for controlling the rate of pressure rise between the inlet port and the outlet port, said valve means being slidably disposed in the bore and having a valving element operative in use to control fluid communication between the inlet port and the outlet port, pressure responsive means for biasing the valving element to a position blocking communication between the inlet port and the outlet port and opening communication between the outlet port and the first drain port, means for biasing the valving element in opposition to the pressure responsive means, and a load piston operative to control the force of the biasing means;

a pressure chamber defined in the bore adjacent the load piston;

restrictive passage means for controllably interconnecting said inlet port and said pressure chamber; and an input actuator mechanism disposed in the bore adjacent the pressure chamber and operative in use to move through a predetermined travel distance, said input actuator mechanism being operative to control communication between the pressure chamber and the second drain port so that the rate of pressure rise between the inlet port and the outlet port is selectively controlled for inching of the vehicle through a portion of the predetermined travel distance of the input mechanism and the rate of pressure rise is automatically controlled with movement of the input actuator mechanism in the remaining portion of the predetermined travel distance.

2. The modulating inching valve, as set forth in claim 1, wherein the input actuator mechanism includes a sleeve disposed in the bore adjacent the pressure chamber and an input member slidably disposed in the sleeve and operative to control communication of the pressure chamber and the second drain port.

3. The modulating inching valve, as set forth in claim 2, wherein the input member has a passageway defined therein and is operative in response to the position of the input member with respect to the sleeve to block communication of the pressure chamber with the second drain port.

4. The modulating inching valve, as set forth in claim 3, wherein the input member has a stop that abuts an end of the load piston and controls the position of the load piston with respect to the position of the input member when the pressure chamber is in communication with the second drain port.

5. The modulating inching valve, as set forth in claim 4, wherein a bore is defined in the load piston and the input member is slidably disposed in the bore of the load piston.

6. The modulating inching valve, as set forth in claim 5, wherein the sleeve is movable between a first position and a second position, a spring biases the sleeve to the first position and when inching, the initial pressure build-up in the pressure chamber resulting from the passageway in the input member being partially closed moves the sleeve to the second position against the bias of the spring to quickly and fully block communication of the pressure chamber with the second drain port.

7. The modulating inching valve, as set forth in claim 6, wherein the valving element has first and second ends and the pressure responsive means is located in the valving element and includes a blind bore, a slug is slideably disposed therein to define a pressure chamber between the slug and the bottom of the blind bore, and a passageway to continuously communicate the pressure chamber in the valving element with the outlet port.

8. The modulating inching valve, as set forth in claim 7, wherein the biasing means includes a spring assembly located between the second end of the valving element and the load piston.

9. The modulating inching valve, as set forth in claim 1, wherein the pressure responsive means has means for establishing a plurality of different biasing forces, said establishing means being responsive when in use to various operating conditions of the vehicle.

10. The modulating inching valve, as set forth in claim 9, wherein the valving element has first and second ends and the establishing means includes a stepped blind bore in the first end of the valving element, a first slug slidably disposed therein to establish a first pressure chamber between the slug and the bottom of the stepped blind bore, a first passageway to continuously communicate the first pressure chamber in the valving element with the outlet port, a second slug having a cross-sectional area larger than that of the first slug and slidably disposed in the stepped blind bore adjacent the first slug to establish a second pressure chamber between the first and second slugs, and a second passageway to allow selective communication of the second pressure chamber with the pressurized fluid available to the one fluid actuated device.

11. The modulating inching valve, as set forth in claim 10, wherein the establishing means includes a third slug having a cross-sectional area larger than that of the second slug and slidably disposed in the stepped blind bore adjacent the second slug to establish a third pressure chamber between the second and third slugs, and a third passageway to communicate the third pressure chamber with the pressurized fluid available to another of the plurality of fluid actuated devices.

12. A modulating inching valve in combination with a transmission fluid control system, comprising:
 a source of pressurized fluid;
 a plurality of fluid actuated devices;
 a plurality of valve mechanism operative to selectively control the respective plurality of fluid actuated devices;
 a pressure control valve operative to control the rate of pressure rise to the plurality of fluid actuated devices;
 valve means for controlling the rate of pressure rise to one of the plurality of fluid actuated devices independent of the pressure control valve; and
 an input actuator mechanism having a predetermined travel distance and operative in use to selectively control the valve means so that the rate of pressure rise to the one fluid actuated device is selectively controlled independent of the pressure control valve for inching of the vehicle through a portion of the predetermined travel distances and the rate of pressure rise is automatically controlled by the valve means with movement of the input actuator mechanism in the remaining portion of the predetermined travel distance, said valve means and said input actuator mechanism being located in a common housing, said common housing having a bore defined therein, an inlet port operatively connected to the source of pressurized fluid, an outlet port operatively connected to the one of the fluid actuated devices, and first and second drain ports, each of the ports intersecting the bore at axially spaced locations, said valve means being slidingly disposed in the bore and operative to control fluid communication between the inlet port, the outlet port, and the first drain port, said inner actuator mechanism is located in the bore and a pressure chamber is defined in the bore between the input actuator mechanism and the valve means, the input actuator mechanism includes a sleeve disposed in the bore adjacent the pressure chamber and an input member slideably disposed in the sleeve and is operative to control fluid communication between the pressure chamber and the second drain port during movement of the input actuator mechanism through its predetermined travel distance.

13. The combination, as set forth in claim 12, wherein the input member has a passageway defined therein and is operative in response to the position of the input member with respect to the sleeve to block communication of the pressure chamber with the second drain port.

* * * * *

UNITED STATES PATENT AND TRADEMARK OFFICE
CERTIFICATE OF CORRECTION

PATENT NO. : 4,865,176

DATED : September 12, 1989

INVENTOR(S) : William W. Blake, Alan R. Coutant, Kenneth F. Golan, and Hugh C. Morris It is certified that error appears in the above-identified patent and that said Letters Patent is hereby corrected as shown below:

On the title page,
in the Abstract: Line 23, "operator'3s" should be --operator's--.

Claim 12, Line 35 of the claim: "inner" should be --input--.

Signed and Sealed this

Twenty-fourth Day of July, 1990

*Attest:*

HARRY F. MANBECK, JR.

*Attesting Officer*     *Commissioner of Patents and Trademarks*